US012803779B2

(12) United States Patent
Niu et al.

(10) Patent No.: US 12,803,779 B2
(45) **Date of Patent: *Nov. 17, 2026**

(54) RANDOM NOISE GENERATION FOR MULTIPARTY COMPUTATION

(71) Applicants: BEIJING ZITIAO NETWORK TECHNOLOGY CO. LTD., Beijing (CN); LEMON INC., Grand Cayman (KY)

(72) Inventors: Yougchuan Niu, Beijing (CN); Donghang Lu, Culver City, CA (US); Jian Du, Culver City, CA (US); Haohao Qian, Shanghai (CN); Li Wang, Hangzhou (CN); Qiang Yan, Shanghai (CN)

(73) Assignees: Beijing Zitiao Network Technology Co., Ltd., Beijing (CN); Lemon Inc., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 18/642,891

(22) Filed: Apr. 23, 2024

(65) Prior Publication Data

US 2025/0247204 A1 Jul. 31, 2025

Related U.S. Application Data

(63) Continuation of application No. PCT/CN2024/074554, filed on Jan. 29, 2024.

(51) Int. Cl.

*H04L 9/00* (2022.01)
*G06F 7/58* (2006.01)

(52) U.S. Cl.

CPC .............. *H04L 9/008* (2013.01); *G06F 7/588* (2013.01); *H04L 2209/46* (2013.01); *H04L 2209/50* (2013.01)

(58) Field of Classification Search

CPC ............. H04L 2209/46; H04L 2209/08; H04L 2209/50; G06F 7/588

See application file for complete search history.

(56) References Cited

U.S. PATENT DOCUMENTS 6,834,272 B1 * 12/2004 Naor .................. G06Q 20/0855 705/37
8,977,855 B2 * 3/2015 Kolesnikov .............. G09C 1/00 713/168

(Continued)

FOREIGN PATENT DOCUMENTS

WO WO 2018174873 A1 9/2018

OTHER PUBLICATIONS

Costa, Bruno, et al. "Randomized oblivious transfer for secure multiparty computation in the quantum setting" Entropy 23.8 (2021): 1001, (Year: 2021).*

(Continued)

*Primary Examiner* — Ellen Tran
(74) *Attorney, Agent, or Firm* — Fish & Richardson P.C.

(57) ABSTRACT

Example computer-implemented methods and systems for secure random noise generation are disclosed. One example method includes generating, by a first party, n random first bits and n $\ell$-bit strings. The first party generates, based on the n $\ell$-bit strings and the n random first bits, n pairs of $\ell$-bit input messages. The first party performs n 1-out-of-2 oblivious transfers (OTs) of the n pairs of $\ell$-bit input messages from the first party to a second party. The first party generates, based on the n $\ell$-bit strings, a first random number. The first party performs, based on the first random number, secure multiparty computation (MPC) that involves the first party and the second party.

20 Claims, 4 Drawing Sheets

300

(56) References Cited

U.S. PATENT DOCUMENTS

| | | | | |
|---|---|---|---|---|
| 8,990,570 | B2 * | 3/2015 | Kolesnikov | H04L 9/085 380/46 |
| 9,158,925 | B2 * | 10/2015 | Kamara | G06F 21/60 |
| 9,311,670 | B2 * | 4/2016 | Hoffberg | H04W 4/029 |
| 9,450,938 | B1 | 9/2016 | Lampkins et al. | |
| 9,536,114 | B1 | 1/2017 | El Defrawy et al. | |
| 10,360,395 | B2 * | 7/2019 | Fiske | H04L 9/0869 |
| 11,201,734 | B2 | 12/2021 | Zheng et al. | |
| 11,438,146 | B1 | 9/2022 | Ranellucci | |
| 11,552,794 | B2 * | 1/2023 | Becher | G06F 7/582 |
| 11,836,263 | B1 * | 12/2023 | Du | H04L 9/085 |
| 12,282,867 | B2 * | 4/2025 | Wang | G06F 21/6245 |
| 2007/0083493 | A1 * | 4/2007 | Dwork | G06F 21/6254 |
| 2010/0094842 | A1 * | 4/2010 | Fattal | H04L 9/0852 707/E17.131 |
| 2017/0149796 | A1 * | 5/2017 | Gvili | H04L 63/0428 |
| 2019/0394019 | A1 * | 12/2019 | Gao | H04L 9/008 |
| 2020/0004973 | A1 | 1/2020 | Li et al. | |
| 2020/0007514 | A1 | 1/2020 | Li et al. | |
| 2020/0153640 | A1 | 5/2020 | Ranellucci et al. | |
| 2020/0259800 | A1 | 8/2020 | Masny et al. | |
| 2020/0358610 | A1 | 11/2020 | Yeo et al. | |
| 2020/0389304 | A1 | 12/2020 | Gryb et al. | |
| 2021/0058241 | A1 * | 2/2021 | Georgieva | H04L 9/085 |
| 2021/0160293 | A1 * | 5/2021 | Sinha | H04L 9/0825 |
| 2021/0258149 | A1 | 8/2021 | Kawaguchi | |
| 2021/0342677 | A1 | 11/2021 | Dalli et al. | |
| 2021/0357526 | A1 * | 11/2021 | Yekhanin | H04L 9/0894 |
| 2022/0014355 | A1 * | 1/2022 | Gama | H04L 63/04 |
| 2022/0038442 | A1 | 2/2022 | Lev | |
| 2022/0058022 | A1 * | 2/2022 | Fiske | G06F 9/30058 |
| 2022/0300618 | A1 | 9/2022 | Ding et al. | |
| 2022/0405407 | A1 * | 12/2022 | Bai | G06N 20/00 |
| 2023/0050494 | A1 | 2/2023 | Yanai et al. | |
| 2023/0120202 | A1 | 4/2023 | Yanai | |
| 2023/0143175 | A1 * | 5/2023 | Sehrawat | G06F 17/16 380/278 |
| 2023/0289469 | A1 * | 9/2023 | Uzun | H04L 9/008 |
| 2024/0039697 | A1 | 2/2024 | Wu et al. | |
| 2024/0135024 | A1 * | 4/2024 | Du | G06F 21/6227 |
| 2024/0160914 | A1 * | 5/2024 | Kutt | G06N 3/084 |
| 2024/0169074 | A1 * | 5/2024 | Leung | G06F 21/53 |
| 2024/0235842 | A1 * | 7/2024 | Watson | H04L 9/0861 |
| 2024/0333492 | A1 * | 10/2024 | Badrinarayanan | H04L 9/3013 |
| 2024/0386131 | A1 * | 11/2024 | Sharma | G06F 21/6245 |
| 2024/0396735 | A1 * | 11/2024 | Mukherjee | H04L 9/3221 |
| 2025/0036803 | A1 * | 1/2025 | Carr | G06F 21/602 |
| 2025/0037072 | A1 * | 1/2025 | Kumar | G06F 21/6245 |
| 2025/0038947 | A1 | 1/2025 | Fiske | |
| 2025/0045450 | A1 * | 2/2025 | Jiang | G06F 21/6245 |
| 2025/0106004 | A1 * | 3/2025 | Zhu | H04L 9/0625 |
| 2025/0182123 | A1 * | 6/2025 | Das | G06Q 40/02 |
| 2025/0232058 | A1 * | 7/2025 | Ghazi | G06F 21/6245 |
| 2025/0245366 | A1 | 7/2025 | Zhang et al. | |
| 2025/0247369 | A1 | 7/2025 | Niu et al. | |
| 2025/0274274 | A1 | 8/2025 | Sehrawat et al. | |
| 2025/0370179 | A1 | 12/2025 | Kashyap et al. | |

OTHER PUBLICATIONS

Branco, Pedro, et al. "ROTed: Random oblivious transfer for embedded devices" IACR Transactions on Cryptographic Hardware and Embedded Systems (2021): 215-238, Aug. 2021 (Year: 2021).*

Yadav, Vijay Kumar, et al. "A survey of oblivious transfer protocol" ACM Computing Surveys (CSUR) 54.10s (2022): 1-37 Sep. 2022 (Year: 2022).*

Burler, David, et al. "Formalising oblivious transfer in semi-honest and malicious model in CryptHOL" Proceedings of the 9th ACM SIGPLAN International Conference on Certified Programs and Proofs. 2020, Jan. 2020 (Year: 2020).*

Eriguchi et al., "Efficient Noise Generation Protocols for Differentially Private Multiparty Computation," IEEE Transactions on Dependable and Secure Computing, Nov.-Dec. 2023, 20(6):4486-4501.

Huang et a., "Cheetah: Lean and Fast Secure Two-Party Deep Neural Network Inference (Full Version)," Proceedings of the 31st USENIX Security Symposium, Boston, Ma, USA, Aug. 10-12, 2022, 20 pages.

Yang et al., "Ferret: Fast Extension for coRRElated oT with small communication," In Proceedings of the 2020 ACM SIGSAC Conference on Computer and Communications Security (CCS), online, Nov. 9-13, 2020, 1607-1626, 41 pages.

International Search Report in International Appln. No. PCT/CN2024/074545, mailed on Jul. 19, 2024, 3 pages (with English translation only).

Keller et al., "Secure Noise Sampling for DP in MPC with Finite Precision," Proceedings of the 19th International Conference on Availability, Reliability and Security (ARES 2024), Jul. 30-Aug. 2, 2024, Vienna, Austria, 12 pages.

Notice of Allowance in U.S. Appl. No. 18/664,425, mailed on Apr. 21, 2026, 12 pages.

Delpech de Saint Guilhem et al., "Zero-Knowledge Systems from MPC-in-the-Head and Oblivious Transfer," Paper, Presented at Proceedings of the 19th IMA International Conference: Cryptography and Coding, IMACC 2023, London, UK, Dec. 12-14, 2023; Lecture Notes in Computer Science, Springer, Dec. 4, 2023, 14421:120-136.

Office Action in U.S. Appl. No. 18/664,425, mailed on Jan. 8, 2026, 9 pages.

Office Action in U.S. Appl. No. 18/664,425, mailed on Sep. 4, 2025, 9 pages.

Saha et al., "Application of Randomness for Security and Privacy in Multi-Party Computation," IEEE Transactions on Dependable and Secure Computing, Nov./Dec. 2024, 21(6):5694-5705.

* cited by examiner

Method 200 : Two-party semi-honest protocol to sample noise following binomial distribution $\mathbf{B}(n, p = 0.5)$

Output : $[y]$ where $y$ is a random sample following $\mathbf{B}(n, 0.5)$

1 for $i \leftarrow \{1,2\}$ do

2 Party $i$ generates random bits $\{a_{i,j}\}_{j \leftarrow \{1,\ldots,n\}}$ where each value equals to 1 with probability $p = 0.5$, and 0 otherwise.

3 for $j \leftarrow \{1, 2, \ldots, n\}$ do

4 Party 1 samples $r_j \leftarrow \mathbf{Z}_{2^\ell}$.

5 Party 1 samples $s_{1,j} = (-r_j + a_{1,j}) \bmod 2^\ell$.

6 Party 1 samples $s_{2,j} = (-r_j + 1 - a_{1,j}) \bmod 2^\ell$.

7 Party 1 and Party 2 invoke $n$ 1-out-of-2 OT in parallel where Party 1 is the sender with inputs $\{(s_{1,j}, s_{2,j})\}_{j \leftarrow \{1,\ldots,n\}}$, and Party 2 is the receiver with selection bits $\{a_{2,j}\}_{j \leftarrow \{1,\ldots,n\}}$. We denote the OT output of Party 2 by $\{x_j\}_{j \leftarrow \{1,\ldots,n\}}$.

8 Party 1 gets the output by locally summing up $r_j$ : $[y]_1 = \sum_{j=1}^{n} r_j \bmod 2^\ell$.

9 Party 2 gets the output by locally summing up $x_j$ : $[y]_2 = \sum_{j=1}^{n} x_j \bmod 2^\ell$.

200

FIG. 2

RANDOM NOISE GENERATION FOR MULTIPARTY COMPUTATION

CLAIM OF PRIORITY

This application claims priority under to International Patent Application Serial No. PCT/CN2024/074554, filed on Jan. 29, 2024, titled "RANDOM NOISE GENERATION FOR MULTIPARTY COMPUTATION", the entire contents of which are hereby incorporated by reference.

BACKGROUND

This specification relates to generating random noise for use in data computation.

Secure multiparty computation techniques, typically denoted "MPC", allow parties to jointly evaluate a function with their private inputs without sharing those inputs with the other parties. Thus, the privacy of individual parties is protected from each other party of the joint computation. An example MPC protocol allows for a particular function on the private data of each party to be computed by each party without sharing their private information with any other party. For example, typical MPC protocols rely on secret sharing to obscure each party's private data from the other parties.

In some MPC scenarios, the function results can leak information about private inputs because of the nature of the computed function. To reduce the risk of private inputs being inferred from MPC results, differential privacy techniques can be employed as part of a given MPC protocol. Differential privacy can be achieved in MPC by introducing some random noise to the MPC results that masks individually identifiable information from the private data used to compute the MPC function.

SUMMARY

This specification is generally directed to computer-implemented methods and systems for random noise generation for two parties in secure MPC. One example method includes generating random noise using a protocol distributed between two parties. The random noise generated is shared differential privacy noise in a two-party setting and is output in the form of secret sharing based on oblivious transfer (OT). The protocol provides security and privacy against the two parties that can be two semi-honest parties. A first party of the two parties generates input messages for n 1-out-of-2 oblivious transfers (OTs) based on n $\ell$-bit strings and n random bits that follow a binomial distribution. A second party of the two parties generates its outputs for the n 1-out-of-2 OTs based on the first party's input messages and n selection bits randomly generated by the second party according to a binomial distribution. Two random numbers for the first party and the second party are generated, respectively, based on the n $\ell$-bit strings and the second party's outputs. In particular, the random numbers correspond to a random sampling of a binomial distribution and are generated in secret share form such that each party generates a respective share portion of the random noise value. The two random numbers are used by the first party and the second party respectively as noise terms added to the outputs of the secure MPC that involves the first party and the second party.

The subject matter described in this specification can be implemented in particular embodiments so as to realize one or more of the following advantages. The techniques described in this specification allow for the collaborative generation of random noise in a secret fashion that can then be used to introduce noise into an MPC result. The disclosed protocol used for random noise generation can provide security and privacy against two semi-honest parties in secure multiparty computation.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

Implementations of the present disclosure are described in further detail herein with reference to an example use case. The example use case includes secure random noise generation for two parties based on 1-out-of-2 oblivious transfers. It is contemplated, however, that implementations of the present disclosure can be realized with any appropriate use case.

BRIEF DESCRIPTION OF DRAWINGS

FIG. 2 illustrates an example method of generating secure random numbers for two parties.

Like reference numbers and designations in the various drawings indicate like elements.

DETAILED DESCRIPTION

Figure 1:
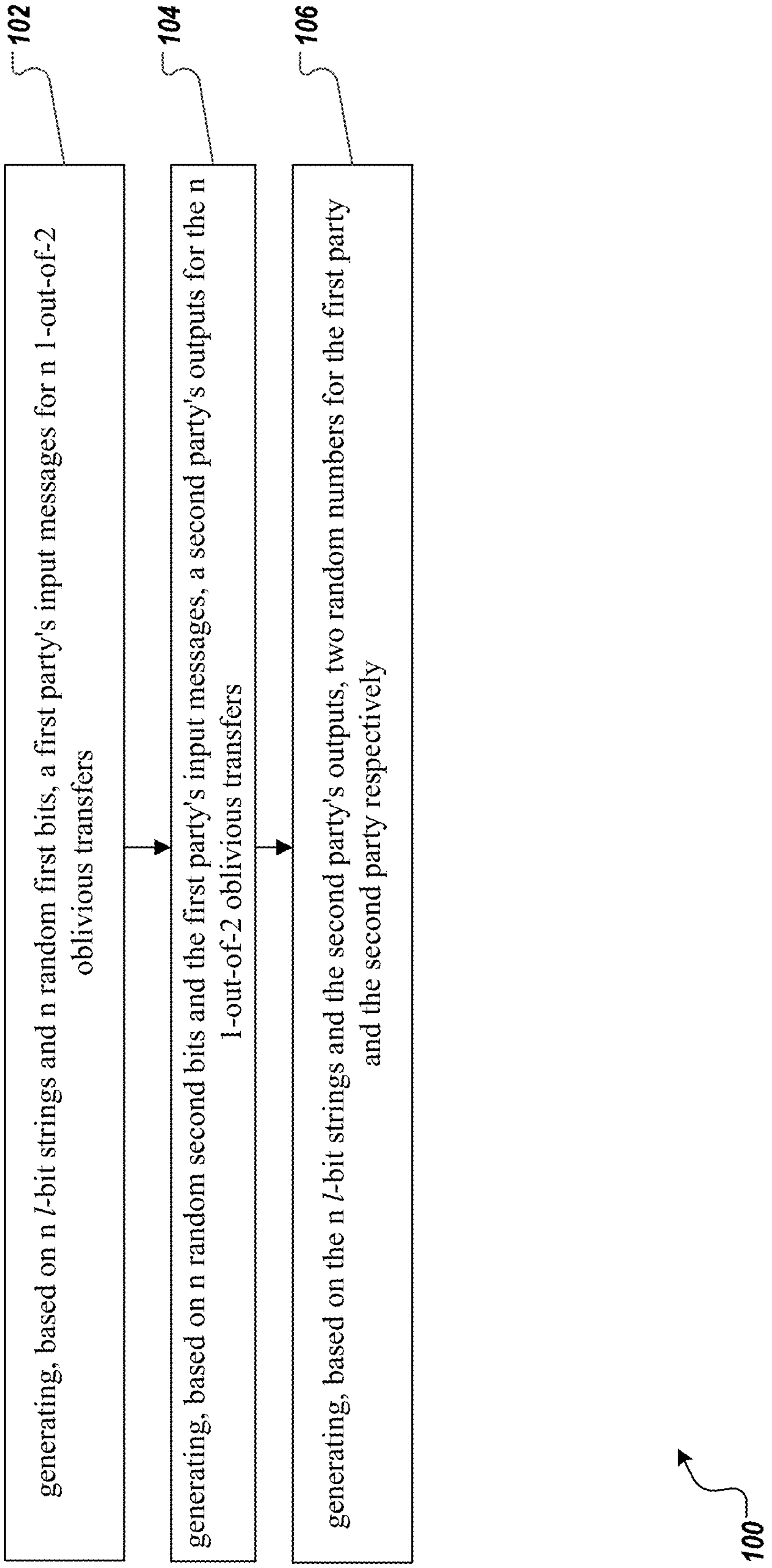
FIG. 1 illustrates an example process of generating random numbers for two parties in secure multiparty computation.

MPC techniques allow parties to jointly evaluate a function with their private inputs without sharing those private inputs with the other parties. There are a number of different MPC techniques that can be used to provide the MPC. Typically, secret sharing is used to provide data privacy. As a simple illustrative example, assume a number of parties working for a company wish to find their average salary without revealing their own salary to any other party. The private data of each participant can be a number representing their salary. Each participant divides their salary into shares, referred to as secret shares. The shares can be random numbers with the constraint being that their sum is equal to the private data, i.e., their salary in this example. For example, if party 1 has an hourly salary of $10 per hour, the shares can be 1, 3, 4, 2, which sum to 10.

If there are four participants, each participant can divide their salary into four shares. The shares are then divided among the parties. Thus, each party has four shares: one of their shares and one share from each other party. By themselves the shares are meaningless random numbers. Each party then sums the values of their shares and reveals that sum to the other participants. Each party then has four sums, which also provides the sum of all the private data values, in other words, the sum of all the salaries. Knowing the total sum of salaries, the parties can then compute a particular function to operate on the salary information, e.g., divide by four and get the average salary, without the private salary information being revealed for any one party.

While MPC works to provide protection of private data used as input to the functions of the MPC, for some functions it is possible to infer some private data from the generated results based on the nature of the functions being computed. For example, large data sets can include information about many different users. Even with anonymization (e.g., removing names), it is possible to combine outputs generated from the seemingly anonymous data to identify individualized information. Differential privacy is a technique to reduce the probability of determining individualized private information from the MPC results without changing the outcome of the function being computed. Typically, this is done by introducing noise to individual data based on some distribution so that there is plausible deniability as to its accuracy, so that no individualized determinations can be made. However, because the distribution of the noise is known, it can be compensated for in the aggregate so that a correct final output is generated.

In a more general example, two entities may wish to compute functions based on large datasets of information. For example, one entity may be a social media entity with a large dataset of information relating to social media content or users. The second entity may be a content sponsor for the social media entity, an academic institution, or other entity. The social media entity needs to maintain the privacy of their dataset such that individualized information, e.g., about a particular user, cannot be obtained by the second entity. Using MPC, and in particular with differential privacy, allows the two entities to perform data analysis as part of evaluating various functions without providing any access to the private data outside of the respective entities and ensuring within the specified degree of differential privacy that the MPC outputs cannot identify any individualized information.

Figure 4:
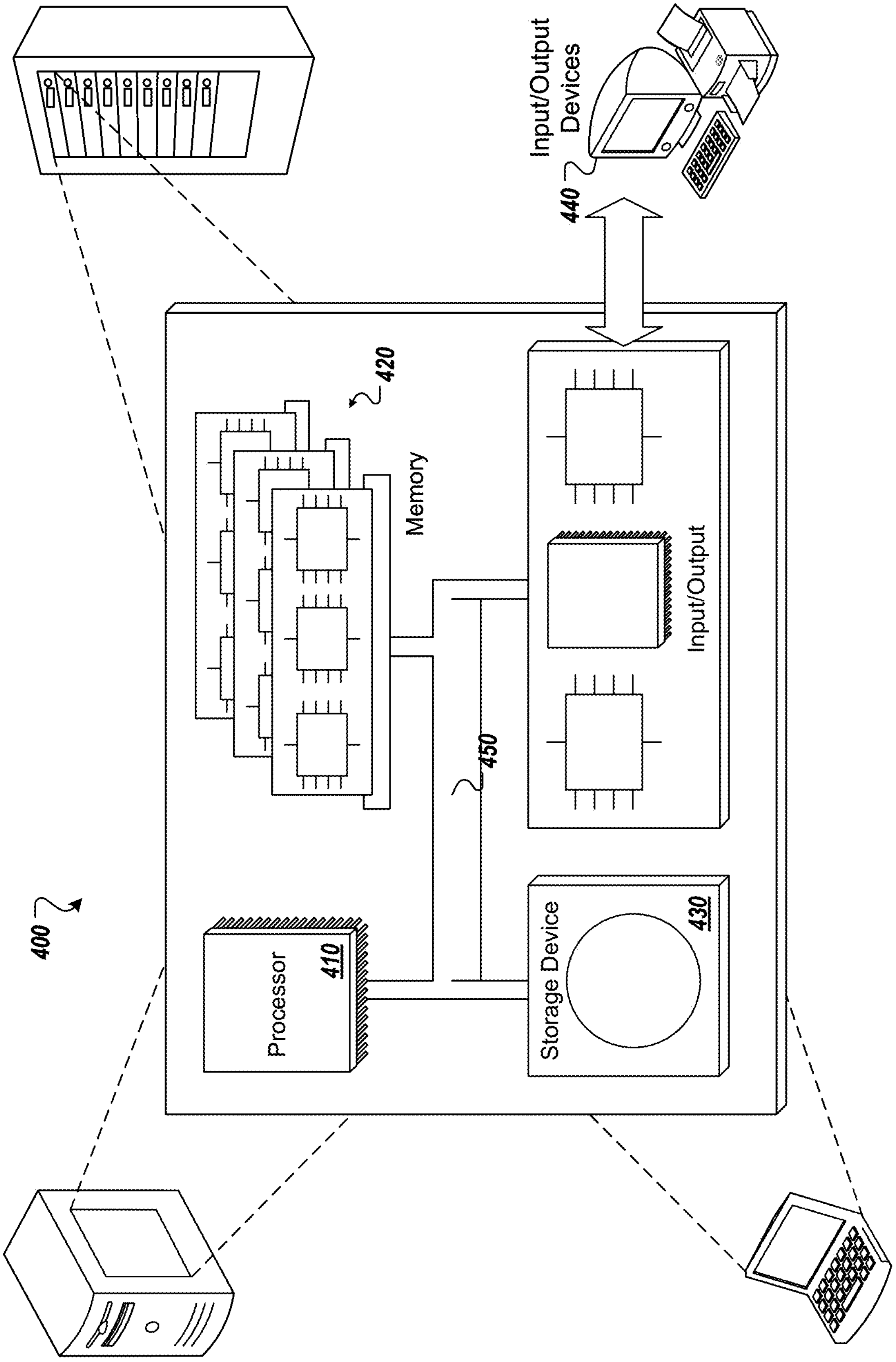
FIG. 4 is a schematic illustration of example computer systems that can be used to execute implementations of the present disclosure.

FIG. 1 illustrates an example process 100 of generating random numbers representing respective shares of a random noise value for two parties in secure multiparty computation. For convenience, process 100 will be described as being performed jointly by a computer system of a first party and a computer system of a second party. Each of the two parties is a participant in the secure multiparty computation, and the two parties jointly compute a function over the two parties' inputs while keeping those inputs private. In some implementations, each party represents a distinct entity or enterprise. The two parties may each include one or more computers, servers, or other computing devices. For example, a first party may correspond to one or more computing devices associated with a first entity and the second party may correspond to one or more computing devices associated with a second entity. An example computer system associated with the first party or the second party is shown in FIG. 4.

In some implementations, process 100 implements a two-party protocol that is secure against semi-honest adversaries in multiparty computation.

At 102, a computer system of a first party, for example, a sender of n 1-out-of-2 oblivious transfers (OTs), generates the first party's n pairs of input messages $\{(s_{1,j}, s_{2,j})\}$ for the n 1-out-of-2 OTs, where j=1, . . . , n. In some implementations, each of the n 1-out-of-2 OTs enables a second party, for example, a receiver of the n 1-out-of-2 OTs, to receive, according to a second party's selection bit unknown to the first party, one message out of a corresponding pair of the first party's n pairs of input messages $\{(s_{1,j}, s_{2,j})\}$. The first party (i.e., the sender) does not know which message in the corresponding pair of the first party's n pairs of input messages $\{(s_{1,j}, s_{2,j})\}$ is received by the second party (i.e., the receiver). The second party does not know the other message in the corresponding pair of the first party's n pairs of input messages $\{(s_{1,j}, s_{2,j})\}$ that the second party does not receive.

In some implementations, to generate the first party's input messages, the computer system of the first party generates n random first bits $\{a_{1,j}\}$ according to a binomial distribution, where j=1, . . . , n, and a value of each of the n random first bits $\{a_{1,j}\}$ is 1 with a probability of 0.5, and 0 with a probability of 0.5. In some cases, generating an n-bit random number allows for an efficient creation of a number that simulates n-Bernoulli trials with probably 0.5. Each bit is selected with a 0.5 probability of being 1 or 0. A share of random noise can then be generated from the n-bit random number. The share of random noise can in turn provide differential privacy of MPC outputs. An example value of n is 64.

In some implementations, the computer system of the first party also generates $\ell$-bit strings $\{r_j\}$, where j=1, . . . , n, and each of the n $\ell$-bit strings $\{r_j\}$ is randomly sampled from a set of $\ell$-bit strings $Z_{2^\ell}$, and the set of $\ell$-bit strings $Z_{2^\ell}$ forms the space of $\ell$-bit strings and includes $2^\ell$ distinct $\ell$-bit strings. For example, when $\ell=2$, there are 4 distinct 2-bit strings, i.e. $Z_{2^2}$={00, 01, 10, 1}.

In some implementations, the computer system of the first party generates the first party's n pairs of input messages $\{(s_{1,j}, s_{2,j})\}$ for the n 1-out-of-2 OTs based on the first party generated n random first bits $\{a_{1,j}\}$ and the n $\ell$-bit random strings $\{r_j\}$, using Equations 1 and 2 below.

$$s_{1,j} = (-r_j + a_{1,j}) \text{ modulo } 2^\ell \quad (1)$$

$$s_{2,j} = (-r_j + 1 - a_{1,j}) \text{ modulo } 2^\ell \quad (2)$$

The modulo operation returns the remainder of a division, after one number is divided by another. For example, a modulo b is the remainder of the division of a by b, where a is the dividend and b is the divisor.

In some implementations, the computer system of the first party (e.g., the sender of the n 1-out-of-2 OTs) interacts with a computer system of a second party (e.g., the receiver of the n 1-out-of-2 OTs) to perform the n 1-out-of-2 OTs of the first party's n pairs of input messages $\{(s_{1,j}, s_{2,j})\}$ from the first party to the second party, as described in 104 below. In some cases, the first party and the second party can be semi-honest adversaries in the n 1-out-of-2 OTs. Two semi-honest adversaries can follow the MPC protocol honestly, but may try to glean as much information from the information they receive from other parties, including through collusion with other parties.

At 104, the computer system of the second party, while working with the computer system of the first party to perform the n 1-out-of-2 OTs, generates outputs $\{x_j\}$ of the second party for the n 1-out-of-2 OTs, where j=1, . . . , n. In some implementations, to jointly perform the n 1-out-of-2 OTs with the first party in order to generate the outputs of the second party for the n 1-out-of-2 OTs, the second party generates n random second bits $\{a_{2,j}\}$ according to a binomial distribution, where j=1, . . . , n, and a value of each of the n random second bits $\{a_{2,j}\}$ is 1 with a probability of 0.5, and 0 with a probability of 0.5. The n random second bits $\{a_{2,j}\}$ can be used by the second party as n selection bits for the n 1-out-of-2 OTs respectively. For example, when $a_{2,j}=0$, $x_j=s_{1,j}$; and when $a_{2,j}=1$, $x_j=s_{2,j}$; where j=1, . . . , n.

At 106, the computer system of the first party generates a first random number $y_1$ by locally summing up all the elements in $\{x_j\}_{j\leftarrow\{1,\ldots,n\}}$ using Equation 3 below. In some cases, $y_1$ can be denoted $[y_1]$ to represent a secret share value of a random number y.

$$y_1 = \sum_{j=1}^{n} r_j \text{ modulo } 2^{\ell} \tag{3}$$

The computer system of the second party generates a second random number $y_2$ by locally summing up all the elements in $\{x_j\}_{j\leftarrow\{1,\ldots,n\}}$ using Equation 4 below. In some cases, $y_2$ can be denoted $[y_2]$ to represent a secret share value of a random number y, for example, $y=[y_1]+[y_2]$.

$$y_2 = \sum_{j=1}^{n} x_j \text{ modulo } 2^{\ell} \tag{4}$$

In some implementations, the first random number $y_1$ and the second random number $y_2$ can then be used by the first party and the second party, respectively, to add noise to MPC results. In particular, y1 and y2 may represent secret share values for binomial distribution sampling that can be added to MPC results. Normalizing the random noise shares y1 and y2 and adding the normalized y1 and y2 to the MPC results can provide a statistically defined degree of differential privacy in the generated results so that the probability of determining any individualized data as part of any party's private data is decreased.

In some implementations, the communication round of process 100 is two, and the number of communication bits of process 100 is $(2\ell+1)n$. For example, when $\ell=2$ and n=64, the number of communication bits of process 100 is 320.

FIG. 2 illustrates an example method 200, e.g., as implemented by respective computer systems of two parties, of generating secure random numbers for the two parties. Method 200 implements process 100 illustrated in FIG. 1.

In some implementations, components in method 200 can be mapped to components in process 100. For example, steps 1 and 2 in method 200 correspond to the generation of $\{a_{1,j}\}$ in 102 and the generation of $\{a_{2,j}\}$ in 104. Steps 3 through 6 in method 200 correspond to the generation of $\{r_j\}$ and $\{(s_{1,j}, s_{2,j})\}$ in 102. Step 7 in method 200 corresponds to the generation of $\{x_j\}$ in 104. Steps 8 and 9 correspond to the generation of y1 and y2 in 106.

Figure 3:
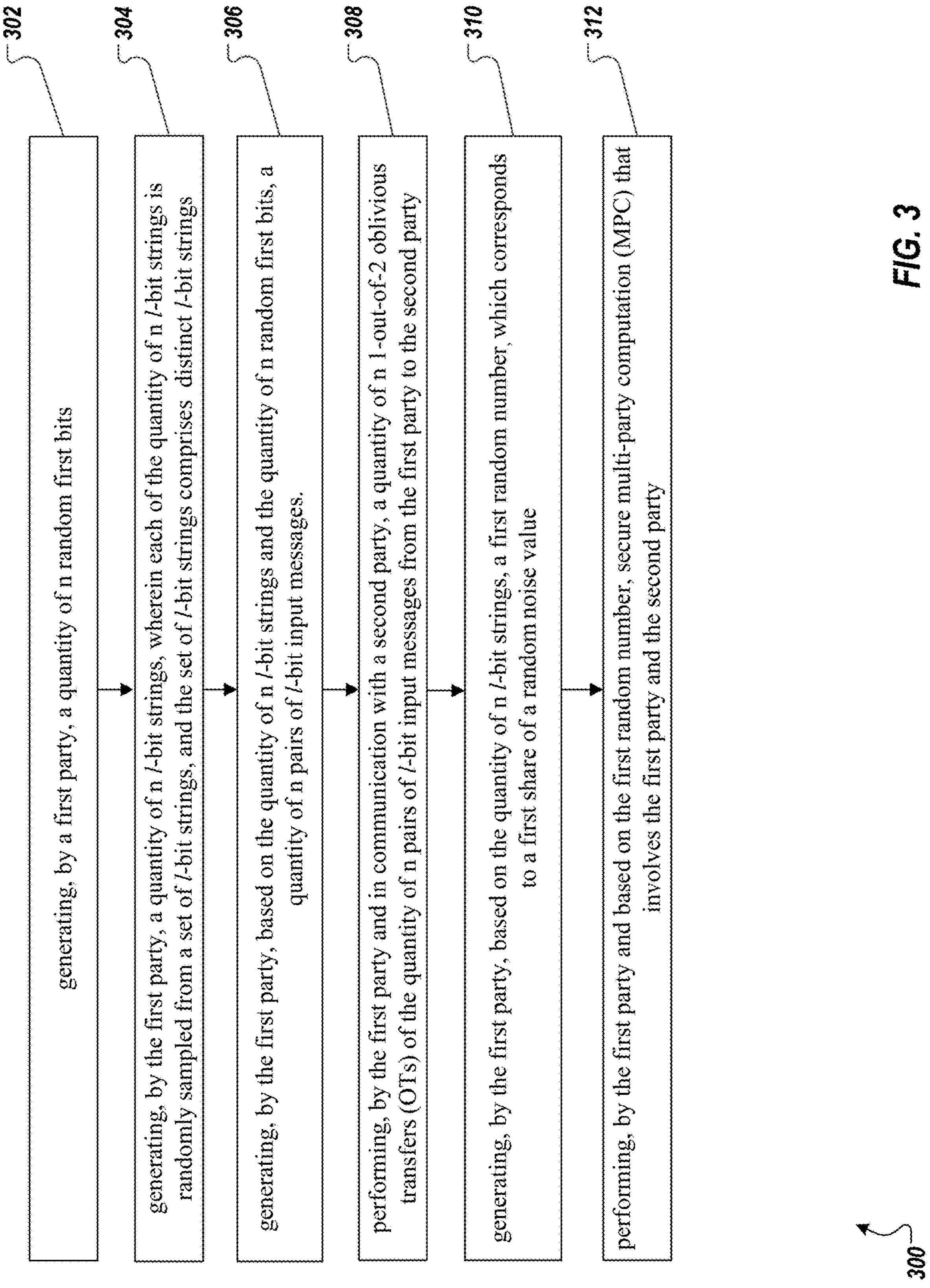
FIG. 3 illustrates an example process of secure random number generation for two parties.

FIG. 3 illustrates an example process 300 of secure random number generation for two parties. For convenience, process 300 will be described as being performed by a computer system of a first party. An example computer system of the first party is shown in FIG. 4.

At 302, a computer system of a first party generates a quantity of n random first bits.

At 304, the computer system of the first party generates a quantity of n $\ell$-bit strings, wherein each of the quantity of n $\ell$-bit strings is randomly sampled from a set of $\ell$-bit strings, and the set of $\ell$-bit strings comprises $2^{\ell}$ distinct $\ell$-bit strings.

At 306, the computer system of the first party generates, based on the quantity of n $\ell$-bit strings and the quantity of n random first bits, a quantity of n pairs of $\ell$-bit input messages.

At 308, the computer system of the first party performs, in communication with a second party, a quantity of n 1-out-of-2 oblivious transfers (OTs) of the quantity of n pairs of $\ell$-bit input messages from the first party to the second party.

At 310, the computer system of the first party generates, based on the quantity of n $\ell$-bit strings, a first random number, which corresponds to a first share of a random noise value.

At 312, the computer system of the first party performs, based on the first random number, secure multiparty computation (MPC) that involves the first party and the second party.

In some implementations, the random noise generated from the secure random noise generation system, for example, random numbers $y_1$ and $y_2$ from 106 in FIG. 1, can be added respectively to the outputs of the two parties in the secure multiparty computation. For example, the first party can be a social media entity and the second party can be another entity. MPC may involve one or more datasets of the two parties that wish to compute a function without revealing individualized data form the one or more datasets. Random noise generated from random numbers $y_1$ and $y_2$ can be added to provide a particular degree of differential privacy.

FIG. 4 illustrates a schematic diagram of an example computing system 400. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, and 440 are interconnected using a system bus 450. The processor 410 is capable of processing instructions for execution within the system 400. In some implementations, the processor 410 is a single-threaded processor. The processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 can be a volatile memory unit or a non-volatile memory unit. The storage device 430 is capable of providing mass storage for the system 400. The storage device 430 is a computer-readable medium. The storage device 430 may be a floppy disk device, a hard disk device, an optical disk device, or a tape device. The input/output device 440 provides input/output operations for the system 400. The input/output device 440 includes a keyboard and/or pointing device. The input/output device 440 includes a display unit for displaying graphical user interfaces.

In addition to the embodiments of the attached claims and the embodiments described above, the following embodiments are also innovative:

Embodiment 1 is a computer-implemented method comprising: generating, by a first party, a quantity of n random first bits $\{a_{1,j}\}$, wherein j=1, . . . , n, and n is an integer greater than 0; generating, by a first party, a quantity of n random first bits; generating, by the first party, a quantity of n $\ell$-bit strings, wherein each of the quantity of n $\ell$-bit strings is randomly sampled from a set of $\ell$-bit strings, and the set of $\ell$-bit strings comprises $2^{\ell}$ distinct $\ell$-bit strings; generating, by the first party and based on the quantity of n $\ell$-bit strings and the quantity of n random first bits, a quantity of n pairs of $\ell$-bit input messages; performing, by the first party and in communication with a second party, a quantity of n 1-out-of-2 oblivious transfers (OTs) of the quantity of n pairs of $\ell$-bit input messages from the first party to a second party; generating, by the first party and based on the quantity of n $\ell$-bit strings, a first random number, which corresponds to a first share of a random noise value; and performing, by the first party and based on the first random number, secure multiparty computation (MPC) that involves the first party and the second party.

Embodiment 2 is the method of embodiment 1, wherein generating the quantity of n pairs of $\ell$-bit random input messages comprises: generating the quantity of n pairs of $\ell$-bit random input messages using $s_{1,j}=(-r_j+a_{1,j})$ modulo $2^\ell$ and $s_{2,j}=(-r_j+1-a_{1,j})$ modulo $2^\ell$, wherein $(s_{1,j}, s_{2,j})$ is a j-th pair of the n pairs of $\ell$-bit random input messages, $r_j$ is a j-th $\ell$-bit string of the n $\ell$-bit strings, $a_{1,j}$ is a j-th random first bit of the n random first bits, and j=1, . . . , n.

Embodiment 3 is the method of any one of embodiments 1 through 2, wherein a value of each of the n random first bits is (1) 1 with a probability of 0.5 and (2) 0 with a probability of 0.5.

Embodiment 4 is the method of any one of embodiments 1 through 3, wherein generating the first random number comprises generating the first random number using $$y_1 = \sum_{j=1}^{n} r_j$$

modulo $2^\ell$, wherein $y_1$ is the first random number and $r_j$ is a j-th $\ell$-bit string of the n $\ell$-bit strings.

Embodiment 5 is the method of any one of embodiments 1 through 4, wherein the first random number follows a binomial distribution with parameters n and p, wherein p=0.5.

Embodiment 6 is the method of any one of embodiments 1 through 5, wherein the first party is a social media entity and the second party is an entity engaging in the secure MPC with the social media entity.

Embodiment 7 is the method of any one of embodiments 1 through 6, wherein performing the secure MPC comprises adding, by the first party, noise corresponding to the first random number to results of the secure MPC.

Embodiment 8 is a computer-implemented system comprising: one or more computers; and one or more computer memory devices interoperably coupled with the one or more computers and having tangible, non-transitory, machine-readable media storing one or more instructions that, when executed by the one or more computers, cause the computer-implemented system to perform one or more operations comprising: generating, by a first party, a quantity of n random first bits; generating, by a second part, a quantity of n random second bits; generating, by the first party, a quantity of n $\ell$-bit strings, wherein each of the quantity of n $\ell$-bit strings is randomly sampled from a set of $\ell$-bit strings, and the set of $\ell$-bit strings comprises $2^\ell$ distinct $\ell$-bit strings; generating, by the first party and based on the quantity of n $\ell$-bit strings and the quantity of n random first bits, a quantity of n pairs of $\ell$-bit input messages; performing, by the first party and the second party, a quantity of n 1-out-of-2 oblivious transfers (OTs) of the quantity of n pairs of $\ell$-bit input messages from the first party to the second party; generating, by the first party and based on the quantity of n $\ell$-bit strings, a first random number, which corresponds to a first share of a random noise value; generating, by the second party and based on a quantity of n 1-out-of-2 oblivious transfer (OT) outputs of the second party, a second random number, which corresponds to a second share of the random noise value; and performing, by the first party and the second party and based on the first random number and the second random number, secure multiparty computation (MPC) that involves the first party and the second party.

Embodiment 9 is the computer-implemented system of embodiment 8, wherein generating the quantity of n pairs of $\ell$-bit random input messages comprises: generating the quantity of n pairs of $\ell$-bit random input messages using $s_{1,j}=(-r_j+a_{1,j})$ modulo $2^\ell$ and $s_{2,j}=(-r_j+1-a_{1,j})$ modulo $2^\ell$, wherein $(s_{1,j}, s_{2,j})$ is a j-th pair of the n pairs of $\ell$-bit random input messages, $r_j$ is a j-th $\ell$-bit string of the n $\ell$-bit strings, $a_{1,j}$ is a j-th random first bit of the n random first bits, and j=1, . . . , n.

Embodiment 10 is the computer-implemented system of any one of embodiments 8 through 9, wherein a value of each of the n random first bits is (1) 1 with a probability of 0.5 and (2) 0 with a probability of 0.5, and a value of each of the n random second bits is (1) 1 with a probability of 0.5 and (2) 0 with a probability of 0.5.

Embodiment 11 is the computer-implemented system of any one of embodiments 8 through 10, wherein for a j-th 1-out-of-2 oblivious transfer (OT), $x_j=s_{1,j}$ when $a_{2,j}=0$, and $x_j=s_{2,j}$ when $a_{2,j}=1$, wherein $x_j$ is a j-th output of the n 1-out-of-2 OT outputs of the second party, $(s_{1,j}, s_{2,j})$ is a j-th pair of the n pairs of $\ell$-bit random input messages, $a_{2,j}$ is a j-th random second bit of the n random second bits, and j=1, . . . , n.

Embodiment 12 is the computer-implemented system of any one of embodiments 8 through 11, wherein generating the first random number comprises generating the first random number using $$y_1 = \sum_{j=1}^{n} r_j \text{ modulo } 2^\ell,$$

wherein $y_1$ is the first random number and $r_j$ is a j-th $\ell$-bit string of the n $\ell$-bit strings.

Embodiment 13 is the computer-implemented system of any one of embodiments 8 through 12, wherein generating the second random number $y_2$ comprises generating $y_2$ using $$y_2 = \sum_{j=1}^{n} x_j \text{ modulo } 2^\ell,$$

wherein $y_2$ is the second random number and $x_j$ is a j-th output of the n 1-out-of-2 oblivious transfer (OT) outputs of the second party.

Embodiment 14 is the computer-implemented system of any one of embodiments 8 through 13, wherein the first random number and the second random number follow a binomial distribution with parameters n and p, wherein p=0.5.

Embodiment 15 is the computer-implemented system of any one of embodiments 8 through 14, wherein the first party is a social media entity and the second party is an entity engaging in the secure MPC with the social media entity.

Embodiment 16 is the computer-implemented system of any one of embodiments 8 through 15, wherein performing the secure MPC comprises adding, by the first party, noise corresponding to the first random number to results of the secure MPC.

Embodiment 17 is a non-transitory computer-readable medium storing one or more instructions executable by a computer system to perform operations including the methods of any one of embodiments 1 to 7.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for generating random noise in response to a secure multiparty computation request comprising:

generating, by a first party having a first processor, a quantity of n random first bits;

generating, by the first party, a quantity of n $\ell$-bit strings, wherein each of the quantity of n $\ell$-bit strings is randomly sampled from a set of $\ell$-bit strings, and the set of $\ell$-bit strings comprises $2^{\ell}$ distinct $\ell$-bit strings;

generating, by the first party and based on the quantity of n $\ell$-bit strings and the quantity of n random first bits, a quantity of n pairs of $\ell$-bit input messages;

performing, by the first party and in communication with a second party having a second processor, a quantity of n 1-out-of-2 oblivious transfers (OTs) of the quantity of n pairs of $\ell$-bit input messages from the first party to the second party;

generating, by the first party and based on the quantity of n $\ell$-bit strings, a first random number;

performing, by the first party and based on the first random number, secure multiparty computation (MPC) that involves the first party and the second party; and obtaining results of the secure MPC including the random noise, wherein the random noise is obtained based on a first share of a random noise value corresponding to the first random number.

2. The computer-implemented method of claim 1, wherein generating the quantity of n pairs of $\ell$-bit random input messages comprises:

generating the quantity of n pairs of $\ell$-bit random input messages using $s_{1,j}=(-r_j+a_{1,j})$ modulo $2^{\ell}$ and $s_{2,j}=(-r_j+1-a_{2,j})$ modulo $2^{\ell}$, wherein $(s_{1,j}, s_{2,j})$ is a j-th pair of the n pairs of $\ell$-bit random input messages, $r_j$ is a j-th $\ell$-bit string of the n $\ell$-bit strings, $a_{1,j}$ is a j-th random first bit of the n random first bits, and j=1, . . . , n.

3. The computer-implemented method of claim 1, wherein a value of each of the n random first bits has a probability of 50% of being equal to 1 and a probability of 50% of being equal to 0.

4. The computer-implemented method of claim 1, wherein generating the first random number comprises generating the first random number using $$y_1 = \sum_{j=1}^{n} r_j \text{ modulo } 2^{\ell},$$

wherein $y_1$ is the first random number and $r_j$ is a j-th $\ell$-bit string of the n $\ell$-bit strings.

5. The computer-implemented method of claim 1, wherein the first random number follows a binomial distribution with parameters n and p, and wherein p=0.5.

6. The computer-implemented method of claim 1, wherein the first party is a social media entity and the second party is a content sponsor for the social media entity.

7. The computer-implemented method of claim 1, wherein performing the secure MPC comprises adding, by the first party, noise corresponding to the first random number to results of the secure MPC.

8. A computer-implemented system comprising:

one or more computers; and one or more computer memory devices interoperably coupled with the one or more computers and having tangible, non-transitory, machine-readable media storing one or more instructions that, when executed by the one or more computers, cause the computer-implemented system to perform one or more operations comprising:

generating, by a first party having a first processor, a quantity of n random first bits;

generating, by a second party having a second processor, a quantity of n random second bits;

generating, by the first party, a quantity of n $\ell$-bit strings, wherein each of the quantity of n $\ell$-bit strings is randomly sampled from a set of $\ell$-bit strings, and the set of $\ell$-bit strings comprises $2^{\ell}$ distinct $\ell$-bit strings;

generating, by the first party and based on the quantity of n $\ell$-bit strings and the quantity of n random first bits, a quantity of n pairs of $\ell$-bit input messages;

performing, by the first party and the second party, a quantity of n 1-out-of-2 oblivious transfers (OTs) of the quantity of n pairs of $\ell$-bit input messages from the first party to the second party;

generating, by the first party and based on the quantity of n $\ell$-bit strings, a first random number;

generating, by the second party and based on a quantity of n 1-out-of-2 oblivious transfer (OT) outputs of the second party, a second random number;

performing, by the first party and the second party and based on the first random number and the second random number, secure multiparty computation (MPC) that involves the first party and the second party; and obtaining results of the secure MPC including a random noise, wherein the random noise is obtained based on a first share of a random noise value corresponding to the first random number and a second share of the random noise value corresponding to the second random number.

9. The computer-implemented system of claim 8, wherein generating the quantity of n pairs of $\ell$-bit random input messages comprises:

generating the quantity of n pairs of $\ell$-bit random input messages using $s_{1,j}=(-r_j+a_{1,j})$ modulo $2^{\ell}$ and $s_{2,j}=(-r_j+1-a_{1,j})$ modulo $2^{\ell}$, wherein $(s_{1,j}, s_{2,j})$ is a j-th pair of the n pairs of $\ell$-bit random input messages, $r_j$ is a j-th $\ell$-bit string of the n $\ell$-bit strings, $a_{1,j}$ is a j-th random first bit of the n random first bits, and j=1, . . . , n.

10. The computer-implemented system of claim 8, wherein a value of each of the n random first bits has a probability of 50% of being equal to 1 and a probability of 50% of being equal to 0, and a value of each of the n random second bits has a probability of 50% of being equal to 1 and a probability of 50% of being equal to 0.

11. The computer-implemented system of claim 8, wherein for a j-th 1-out-of-2 oblivious transfer (OT), $x_j = s_{1,j}$ when $a_{2,j}=0$, and $x_j = s_{2,j}$ when $a_{2,j}=1$, wherein $x_j$ is a j-th output of the n 1-out-of-2 OT outputs of the second party, $(s_{1,j}, s_{2,j})$ is a j-th pair of the n pairs of $\ell$-bit random input messages, $a_{2,j}$ is a j-th random second bit of the n random second bits, and j=1, . . . , n.

12. The computer-implemented system of claim 8, wherein generating the first random number comprises generating the first random number using $$y_1 = \sum_{j=1}^{n} r_j \text{ modulo } 2^{\ell},$$

wherein $y_1$ is the first random number and $r_j$ is a j-th $\ell$-bit string of the n $\ell$-bit strings.

13. The computer-implemented system of claim 8, wherein generating the second random number $y_2$ comprises generating $y_2$ using $$y_2 = \sum_{j=1}^{n} x_j \text{ modulo } 2^{\ell},$$

wherein $y_2$ is the second random number and $x_j$ is a j-th output of the n 1-out-of-2 oblivious transfer (OT) outputs of the second party.

14. The computer-implemented system of claim 8, wherein the first random number and the second random number follow a binomial distribution with parameters n and p, and wherein p=0.5.

15. The computer-implemented system of claim 8, wherein the first party is a social media entity and the second party is with a content sponsor for the social media entity.

16. The computer-implemented system of claim 8, wherein performing the secure MPC comprises adding, by the first party, noise corresponding to the first random number to results of the secure MPC.

17. A non-transitory computer-readable medium storing one or more instructions executable by a computer system to perform operations comprising:

generating, by a first party having a first processor, a quantity of n random first bits;

generating, by the first party, a quantity of n $\ell$-bit strings, wherein each of the quantity of n $\ell$-bit strings is randomly sampled from a set of $\ell$-bit strings, and the set of $\ell$-bit strings comprises $2^{\ell}$ distinct $\ell$-bit strings;

generating, by the first party and based on the quantity of n $\ell$-bit strings and the quantity of n random first bits, a quantity of n pairs of $\ell$-bit input messages;

performing, by the first party and in communication with a second party having a second processor, a quantity of n 1-out-of-2 oblivious transfers (OTs) of the quantity of n pairs of $\ell$-bit input messages from the first party to a second party;

generating, by the first party and based on the quantity of n $\ell$-bit strings, a first random number;

performing, by the first party and based on the first random number, secure multiparty computation (MPC) that involves the first party and the second party; and obtaining results of the secure MPC including a random noise, wherein the random noise is obtained based on a first share of a random noise value corresponding to the first random number.

18. The non-transitory computer-readable medium of claim 17, wherein generating the quantity of n pairs of «-bit random input messages comprises:

generating the quantity of n pairs of $\ell$-bit random input messages using $s_{1,j}=(-r_j+a_{1,j})$ modulo $2^{\ell}$ and $s_{2,j}=(-r_j+1-a_{1,j})$ modulo $2^{\ell}$, wherein $(s_{1,j}, s_{2,j})$ is a j-th pair of the n pairs of $\ell$-bit random input messages, $r_j$ is a j-th $\ell$-bit string of the n $\ell$-bit strings, $a_{1,j}$ is a j-th random first bit of the n random first bits, and j=1, . . . , n.

19. The non-transitory computer-readable medium of claim 17, wherein a value of each of the n random first bits has a probability of 50% of being equal to 1 and a probability of 50% of being equal to 0.

20. The non-transitory computer-readable medium of claim 17, wherein generating the first random number comprises generating the first random number using $$y_1 = \sum_{j=1}^{n} r_j \text{ modulo } 2^{\ell},$$

wherein $y_1$ is the first random number and $r_j$ is a j-th $\ell$-bit string of the n $\ell$-bit strings.

* * * * *